United States Patent
Huang et al.

(10) Patent No.: US 11,953,719 B2
(45) Date of Patent: Apr. 9, 2024

(54) OPTICAL POWER SPLITTER AND METHOD OF MANUFACTURING THE SAME

(71) Applicant: TAIWAN SEMICONDUCTOR MANUFACTURING COMPANY LTD., Hsinchu (TW)

(72) Inventors: Tai-Chun Huang, New Taipei (TW); Stefan Rusu, Sunnyvale, CA (US)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 0 days.

(21) Appl. No.: 17/748,115

(22) Filed: May 19, 2022

(65) Prior Publication Data
US 2023/0375779 A1    Nov. 23, 2023

(51) Int. Cl.
| | |
|---|---|
| G02B 6/12 | (2006.01) |
| G02B 6/122 | (2006.01) |
| G02B 6/126 | (2006.01) |
| G02B 6/13 | (2006.01) |
| G02B 6/27 | (2006.01) |

(52) U.S. Cl.
CPC ....... *G02B 6/12002* (2013.01); *G02B 6/1228* (2013.01); *G02B 6/126* (2013.01); *G02B 6/13* (2013.01); *G02B 2006/12038* (2013.01); *G02B 2006/1215* (2013.01); *G02B 2006/12154* (2013.01); *G02B 6/2706* (2013.01)

(58) Field of Classification Search
CPC ...................... G02B 6/2706; G02B 2006/1215
See application file for complete search history.

(56) References Cited

U.S. PATENT DOCUMENTS

| | | | | |
|---|---|---|---|---|
| 10,191,214 B2* | 1/2019 | Dong | .......... | G02B 6/2773 |
| 10,241,273 B2* | 3/2019 | Tu | .......... | G02B 6/2766 |
| 10,935,724 B2* | 3/2021 | Oh | .......... | G02B 6/2733 |
| 2014/0153862 A1* | 6/2014 | Picard | .......... | G02B 6/126 |
| | | | | 385/11 |
| 2018/0314004 A1* | 11/2018 | Fathpour | .......... | G02B 6/1228 |

FOREIGN PATENT DOCUMENTS

CN    105759355 A   *  7/2016    ......... G02B 6/1226

OTHER PUBLICATIONS

CN-105759355-A English translation (Year: 2016).*

* cited by examiner

*Primary Examiner* — Charlie Y Peng
(74) *Attorney, Agent, or Firm* — WPAT LAW; Anthony King

(57) ABSTRACT

An optical device is provided. The optical device includes a substrate, a first optical layer; a high k layer, and a second optical layer. The first optical layer is disposed on the substrate. The first optical layer comprises a top surface, a first sidewall, and a second side-wall opposite thereto. The high k layer is disposed on the top surface of the first optical layer. The second optical layer is disposed on the high k layer. The second optical layer includes a top surface, a third sidewall, and a fourth sidewall opposite thereto. The first sidewall of the first optical layer is misaligned with the third sidewall of the second optical layer. The second sidewall of the first optical layer is coplanar with the fourth sidewall of the second optical layer.

20 Claims, 7 Drawing Sheets

ND METHOD
OPTICAL POWER SPLITTER AND METHOD OF MANUFACTURING THE SAME

TECHNICAL FIELD

The present disclosure relates, in general, to optical devices and method of manufacturing the same. Specifically, the present disclosure relates to a silicon nitride photonics vertical polarization power splitter and method of manufacturing the same.

BACKGROUND

Most market-available silicon photonic devices are two-dimensional (2D), such that the existing waveguide is mostly defined in a single silicon layer. To increase integration density, a three-dimensional (3D) silicon photonic devices is proposed.

BRIEF DESCRIPTION OF THE DRAWINGS

Aspects of the embodiments of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

DETAILED DESCRIPTION

Figure 1:
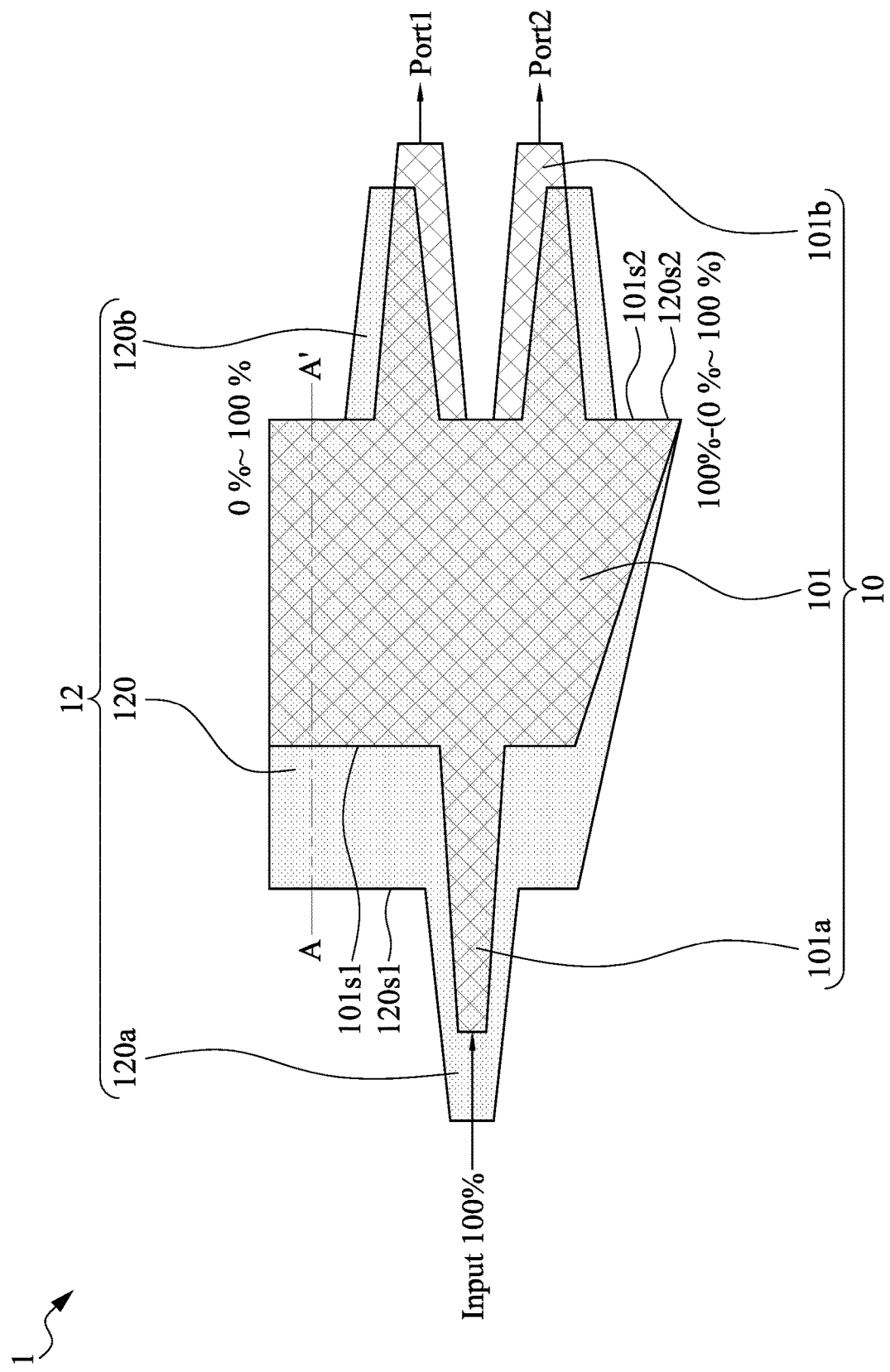
FIG. 1 is top view of an optical device in accordance with some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although terms such as "first," "second" and "third" describe various elements, components, regions, layers and/or sections, these elements, components, regions, layers and/or sections should not be limited by these terms. These terms may only be used to distinguish one element, component, region, layer or section from another. Terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

In a single optical structure, the present disclosure provides a vertical structural optical device used for the polarization division as well as the purely polarized energy separation, which greatly reduces the insertion loss between optical components/layers, and enhances the stability ratio of the polarization energy.

For multiple optical layers, there is a trade-off between the inter-layer transition loss and cross-loss/crosstalk. The thickness of the multiple optical layers may affect the coupling loss. The cross loss may dominate the transition loss between the optical layers. The polarization is split by vertical optical structures of the present disclosure which includes different optical layers/splitters of different lengths from a top view. The polarization may be divided by a gradual waveguide width. In the present disclosure, a multimode interference (MMI) coupler with asymmetric interference structure is proposed for dividing the intensity of the purely polarized light into different proportions.

The present disclosure uses a high k material disposed between the two optical layers of SiN, such that the coupling strength and the extinction ratio of polarization can be increased. The coupling is not affected by the thickness of the oxide layer. In addition, the light splitting ratio required by an external component is used as a design basis. The insertion loss within the optical component (the insertion loss between the two optical layers of SiN) can be reduced by using this optical structure including high k material.

With the development of internet networks, particularly with the advent of cloud computing, cloud storage, and mobile internet, there is an ongoing demand for increased transmission speed and communication quality in communication networks. Due to technical limitations such as light energy consumption, current techniques are no longer able to meet such growing demand. All optical transmission technique has advantages such as low energy consumption and large capacity, and is a future broadband communication development direction.

Photonic integrated chips/devices, particularly using a polarization power splitter, have advantages such as high bandwidth and low power consumption, are compatible with existing CMOS processes. The TE mode (Transverse Electric Wave, electrical transverse wave, no electric field component along the propagation direction of electromagnetic wave) and the TM mode (Transverse Magnetic Wave, magnetic transverse wave, no magnetic field component along the propagation direction of electromagnetic wave) are different. As a result, the TE mode and the TM mode have different transmission speeds and transmission characteristics in the waveguide/optical component. Therefore, most silicon photonic devices are sensitive to polarization. The silicon photonic devices can only be used in either the TE mode or the TM mode.

FIG. 1 is top view of an optical device 1 in accordance with some embodiments of the present disclosure. The optical device 1 includes a substrate 50 (not shown on FIG. 1), an optical component 10, an optical component 12, and a high k layer 40 (not shown on FIG. 1) sandwiched by the optical components 10 and 12. In some embodiments, the substrate 50 may include, for example, silicon oxide (SiO$_2$ or SiO$_x$) or one or more other suitable materials. In some embodiments, the term high k material refers to a material with a higher dielectric constant as compared to silicon dioxide. In some embodiments, the high k layer 40 may include, but is not limited to, silicon nitride, silicon carbide, silicon carbonitride, silicon oxycarbonitride, aluminum oxide, aluminum nitride, aluminumoxynitride, zirconium oxide, zirconium nitride, zirconium aluminum oxide, hafnium oxide, or a combination thereof.

In some embodiments, the optical component 12 includes a first optical layer 120 disposed on the substrate 50. The high k layer 40 is disposed on the first optical layer 120. In some embodiments, the optical component 10 includes a second optical layer 101 disposed on the high k layer 40. In some embodiments, the optical component 12 is disposed on the substrate 50. The high k layer 40 is disposed on the optical component 12. The optical component 10 is disposed on the high k layer 40. In some embodiments, the optical component 12 includes a Transverse Magnetic (TM) power splitter and the optical component 10 includes a Transverse Electric (TE) power splitter. In some embodiments, the optical component 12 works as a TM power splitter and the optical component 10 works as a TE power splitter.

The second optical layer 101 falls within an area of the first optical layer 120 from a top view. In some embodiments, when the first optical layer 120 and the second optical layer 101 project on the substrate 50, a projection area of the second optical layer 101 falls within a projection area of the first optical layer 120 from a top view. In some embodiments, the projection area of the second optical layer 101 is a tapering shape from a top view. The projection area of the second optical layer 101 tapers from the right side to the left side from a top view. The projection area of the first optical layer 120 is a tapering shape from a top view. The projection area of the first optical layer 120 tapers from the right side to the left side from a top view. In some embodiments, the projection area of the first optical layer 120 is larger than the projection area of the second optical layer 101 from a top view. In some embodiments, the second optical layer 101 tapers from the fourth sidewall 101s2 toward the third sidewall 101s1 from a top view. The first optical layer 120 tapers from the second sidewall 120s2 toward the first sidewall 120s1 from a top view.

The optical layer 101 includes an asymmetric profile from a top view. The optical layer 120 includes an asymmetric profile from a top view. The optical layers 101 and 120 include different profiles from a top view.

In some embodiments, the first optical layer 120 includes a TM transmission mode and the second optical layer 101 includes a TE transmission mode. In some embodiments, the first optical layer 120 further comprises a first tapered portion 120a for receiving the light and two second tapered portions 120b for outputting the light, and wherein the second optical layer 101 further comprises a third tapered portion 101a for receiving the light and two fourth tapered portions 101b for outputting the light. In some embodiments, the tapered portion 120a and the third tapered portion 101a can each be referred to as an input port, and the second tapered portions 120b and the fourth tapered portions 101b can each be referred to as an output port.

In some embodiments, the tapered portion 120a, the second tapered portions 120b, the third tapered portion 101a, and the fourth tapered portions 101b may be referred to as leg portions. In other embodiments, the tapered portion 120a, the second tapered portions 120b, the third tapered portion 101a, and the fourth tapered portions 101b may be rectangular from a top view.

The present disclosure provides a silicon nitride photonics vertical polarization power splitter. The vertical polarization power splitter is configured to convert light mixed with both TM mode and TE mode. The light mixed with both TM mode and TE mode is split into light of TE mode and TM mode respectively at the output portions of two different optical splitters. The silicon nitride photonics vertical polarization power splitter can be integrated in Si photonics circuits for broadband polarization-independent communication. The silicon nitride photonics vertical polarization power splitter can be used in other applications through external optical couplings.

In the optical coupling of the silicon nitride photonics vertical polarization power splitter, converting or splitting the light into TM mode and TE mode is sensitive to the propagation length of the waveguide/splitter. The insertion loss between the two vertical optical splitters is high. The insertion loss between the two vertical optical splitters can be reduced by arranging a high k layer between the two vertical optical splitters. The high k layer may reduce the insertion loss within the two vertical optical splitters and ensure the stability ratio of the polarization energy.

This two vertical optical splitters including a high k layer allow the split polarization length to be reduced. This optical structure of the present disclosure including two vertical optical splitters can reduce the split polarization loss and provide high component density. In some embodiments, the two vertical optical splitters may increase the polarization high polarization independence of the TE and TM modes. The two vertical optical splitters including a high k layer allow broadband polarization and polarization independence of the TE and TM modes. In some embodiments, the present disclosure can not only eliminate the influence of thickness of the intermediate oxide layer during manufacture of the vertical optical splitters, but can also be applied to other multilayer structures. In some embodiments, this present disclosure can have different ratios of pure polarization by tuning the width of the MMI couplers.

In some embodiments, the advantages of the present disclosure include at least: (a) the vertical optical structure is used to separate/split the polarization with high polarization independence; (b) the high k material prevents length of the optical couplers from being affected by thickness of the oxide layer; and (c) the polarization extinction ratio can be increased. Using this specially designed MMI couplers, the pure polarization is split proportionally to reduce transmission loss between the two optical layers 101 and 120 and maintain a high polarization extinction ratio (PER).

The optical layers 101 and 120 are specially designed 1×2 MMI couplers which generate multiple light modes by using interference. The second optical layer 101 couples the TE or TM polarization and separates the light power into pure TE/TM polarization light. In some embodiments, the first optical layer 120 couples the TE or TM polarization and separates the light power into pure TE/TM polarization light. In some embodiments, the input polarization light is first separated into TE and TM modes, and then the pure TE/TM is split into different power ratios. As the area/region of the MMI coupler side is reduced from a top view, the reflection of the incident light can be effectively reduced, and the optical structure can also be used to increase the effect of the polarization extinction ratio (PER).

Figure 2:
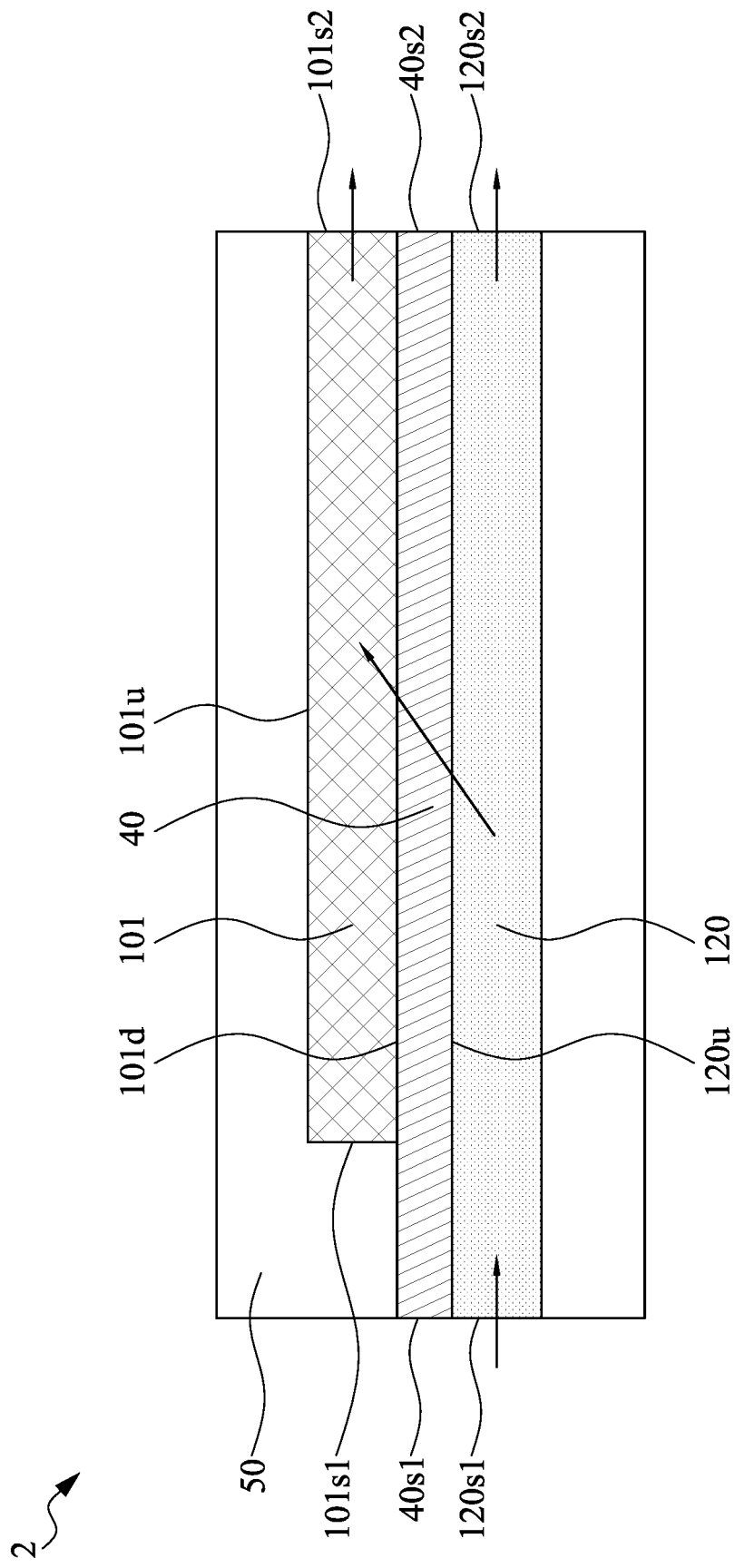
FIG. 2 is a cross-section of the optical device taken along line A-A' of FIG. 1 in accordance with some embodiments of the present disclosure.

FIG. 2 is a cross-section 2 of the optical device 1 taken along line A-A' of FIG. 1, in accordance with some embodiments of the present disclosure. The optical component 12 includes a first optical layer 120 on the substrate 50. The portion 120a, portion 120b, portion 101a, and portion 101b are not shown in FIG. 2. The first optical layer 120 includes a top surface 120u, a first sidewall 120s1, and a second sidewall 120s2 opposite to the first sidewall 120s1. In some embodiments, the high k layer 40 is disposed on the top surface 120u of the first optical layer 120. The second optical layer 101 is disposed on the high k layer 40. The second optical layer 101 includes a top surface 101u, a third sidewall 101s1 and a fourth sidewall 101s2 opposite to the third sidewall 101s1.

The first sidewall 120s1 of the first optical layer 120 is misaligned with the third sidewall 101s1 of the second optical layer 101. In some embodiments, the second sidewall 120s2 of the first optical layer 120 is coplanar with the fourth sidewall 101s2 of the second optical layer 101. The high k layer 40 includes a fifth sidewall 40s1 and a sixth sidewall 40s2 opposite to the fifth sidewall 40s1. The fifth sidewall 40s1 is coplanar with the first sidewall 120s1. The sixth sidewall 40s2 is coplanar with second sidewall 120s2. In some embodiments, a material of the substrate 50 includes silicon oxide ($SiO_2$). In some embodiments, the high k layer 40 fully covers the top surface 120u of the first optical layer 120. In some embodiments, the first optical layer 120 includes a TE power splitter and the second optical layer 101 includes a TM power splitter.

In some embodiments, a material of the first optical layer 120 and the second optical layer 101 includes silicon nitride (SiN or $Si_3N_4$). In some embodiments, the refractive index of the silicon nitride is about 2.02. In some embodiments, the refractive index of the high k layer 40 is about 1.5 to 3.0. In some embodiments, a material of the high k layer 40 includes $ZrO_2$ or $HFO_2$ or other suitable materials. In some embodiments, the refractive index of $ZrO_2$ is about 2.2 and the refractive index of $HFO_2$ is about 1.91. In some embodiments, the refractive index of the high k layer 40 is different from the refractive index of the first optical layer 120 and the second optical layer 101. In some embodiments, the refractive index of the high k layer 40 is larger than the refractive index of the first optical layer 120 and the second optical layer 101. In some embodiments, the refractive index of the high k layer 40 is less than the refractive index of the first optical layer 120 and the second optical layer 101. In some embodiments, the high k layer 40 fully contacts a surface 101b of the second optical layer 101 and a portion of a surface 120u of the first optical layer 120 is exposed from the high k layer 40. In some embodiments, the fifth sidewall 40s1 of the high k layer 40 is coplanar with the third sidewall 101s1 of the second optical layer 101, and the sixth sidewall 40s2 of the high k layer 40 is coplanar with the fourth sidewall 101s2 of the second optical layer 101.

When the light including the TE mode and the TM mode is incident on the first optical layer 120 through the tapered portion 120a, the light is divided into two paths. One path passes the light of the TE mode and the other passes the light of the TM mode. The light of the TE mode is passed through the second optical layer 101 and the light of the TM mode is passed through the first optical layer 120. The first optical layer 120 passes the light of TM mode and the second optical layer 101 passes the light of TE mode. The light of TE mode may be passed through the high k layer 40 to the second optical layer 101. The first optical layer 120 and the second optical layer 101 may be configured as a 1×2 (one input port and two output ports) multi-mode interference (MMI) coupler. The interference imaging is performed on the two MMI couplers (the first optical layer 120 and the second optical layer 101), and finally the TE mode light is output from the output ports of the second optical layer 101 and the TM mode light is output from the output ports of the first optical layer 120. For the TM mode light, no change occurs when the light passes through the first optical layer 120, the output remains the TM mode light, and is split into two paths through the high k layer 40 and second optical layer 101. In some embodiments, the interferometric imaging for the two mode beams is performed in the first optical layer 120 and the second optical layer 101. Finally, the TE mode is output in the second optical layer 101 and the TM mode is output in the first optical layer 120. In this way, the two TE/TM mode polarization beam splitting and polarization are realized.

By using the high k or other materials between the two optical layers 101 and 120 of SiN, coupling strength and extinction ratio of polarization are increased. The coupling between the two optical layers 101 and 120 is not affected by the thickness of the oxide layer of the high k layer. In some embodiments, the light splitting ratio required by an external optical component is used as a design basis. Using the silicon nitride photonics vertical polarization power splitter, the insertion loss of the optical layers 101 and 120 can be reduced, and multifunctional characteristic processing is performed on a single optical component. Because this optical architecture can obtain broadband characteristics, the influence of the wavelength selection between other optical components can be reduced. The refractive index of the middle oxide layer or the high k material layer may be 1.5 to 3.0. In some embodiments, the height of the middle oxide layer or the high k layer 40 is about 50 nm to 1 μm. In some embodiments, the thickness of the first optical layer 120 and the second optical layer 101 is about 50 μm to 500 μm. The high k layer 40 can reduce the coupling length of the first optical layer 120 and the second optical layer 101 and increase pure polarization of the first optical layer 120 and the second optical layer 101. The high k layer 40 can increase the polarization extension ratio (PER) to at least 30 dB.

Figure 3:
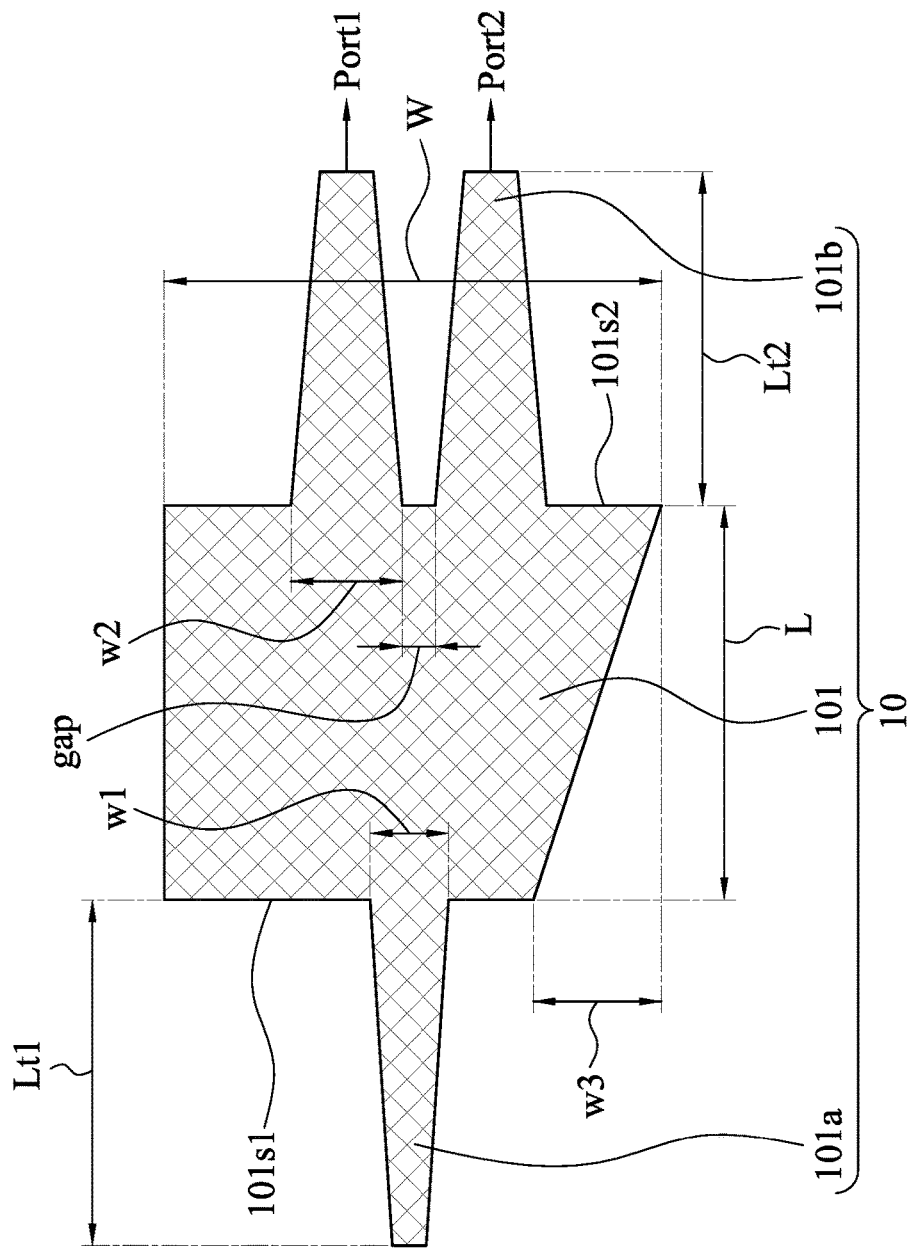
FIG. 3 is top view of an optical component in accordance with some embodiments of the present disclosure.

FIG. 3 is a top view of the optical component 10 in accordance with some embodiments of the present disclosure. In some embodiment, the second optical layer 101 tapers from fourth sidewall 101s2 toward third sidewall 101s1 from a top view. In some embodiments, width W of the second optical layer 101 is about 3 μm to 20 μm. In some embodiments, length of Lt1 is about 90% to 500% of the width W of the second optical layer 101. In some embodiments, length of L is about 400% to 700% of the width of the second optical layer 101. In some embodiments, length of Lt2 is about 90% to 500% of the width W of the second optical layer 101. In some embodiments, length of w1 is about 30% to 60% of the width W of the second optical layer 101. In some embodiments, length of w2 is about 34% to 40% of the width W of the second optical layer 101. In some embodiments, length of w3 is about 0% to 50% of the width W of the second optical layer 101. In some embodiments, length of the gap is about 20% to 40% of the width W of the second optical layer 101. The length of w3 may be controlled to adjust energy proportional modulation. Increasing the length of w3 may increase light power output from the tapered portions 101b. The light power outputs from the two tapered portions 101b are the same. Modifying the length of w3 splits the output power. The light polarization output from the tapered portions 101b is pure TM transmission mode. In some embodiments, the light polarization output from the tapered portions 101b may be pure TE transmission mode.

Figure 4:
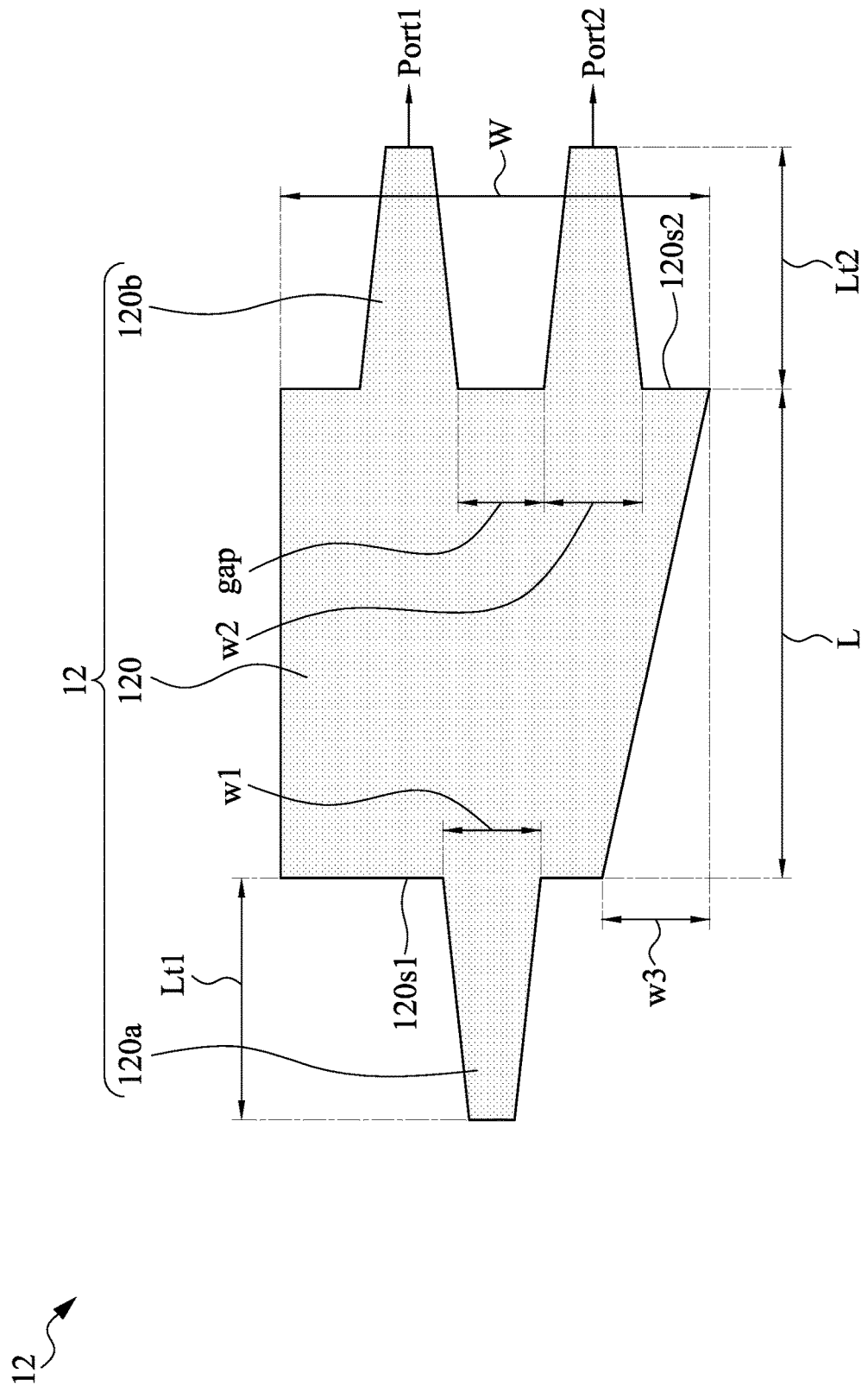
FIG. 4 is top view of an optical component in accordance with some embodiments of the present disclosure.

FIG. 4 is top view of the optical component 12 in accordance with some embodiments of the present disclosure, in which the first optical layer 120 tapers from the second sidewall 120s2 toward the first sidewall 120s1 from a top view. In some embodiments, a lateral width L of the second optical layer 101 is less than a lateral width L of the first optical layer 120. In some embodiments, the first optical layer 120 tapers from the sidewall 120s2 toward the sidewall 120s1 from a top view. In some embodiments, the width W of the first optical layer 120 is about 5 μm to 30 μm. In some embodiments, length of Lt1 is about 90% to 500% of the width W of the first optical layer 120. In some embodiments, length of L is about 400% to 700% of the width W of the first optical layer 120. In some embodiments, length of Lt2 is about 90% to 500% of the width W of the first optical layer 120. In some embodiments, length of w1 is about 30% to 60% of the width W of the first optical layer 120. In some embodiments, length of w2 is about 34% to 40% of the width W of the first optical layer 120. In some embodiments, length of w3 is about 0% to 50% of the width W of the first optical layer 120. In some embodiments, length of gap is about 20% to 40% of the width W of the first optical layer 120. The length of w3 may be controlled to adjust the energy proportional modulation. Increasing the length of w3 may increase the light power output from the tapered portions 120b. The light powers output from the two tapered portions 120b are the same. Modifying the length of w3 splits the output power. The light polarization output from the tapered portions 120b is pure TM transmission mode. In some embodiments, the light polarization output from the tapered portions 120b may be pure TE transmission mode. In some embodiments, the width W of the first optical layer 120 and the second optical layer 101 is about 50 μm to 100 μm. The ratio may be changed from 0% to 100% by adjusting the value of L and width W of the first optical layer 120 and second optical layer 101.

Figure 5:
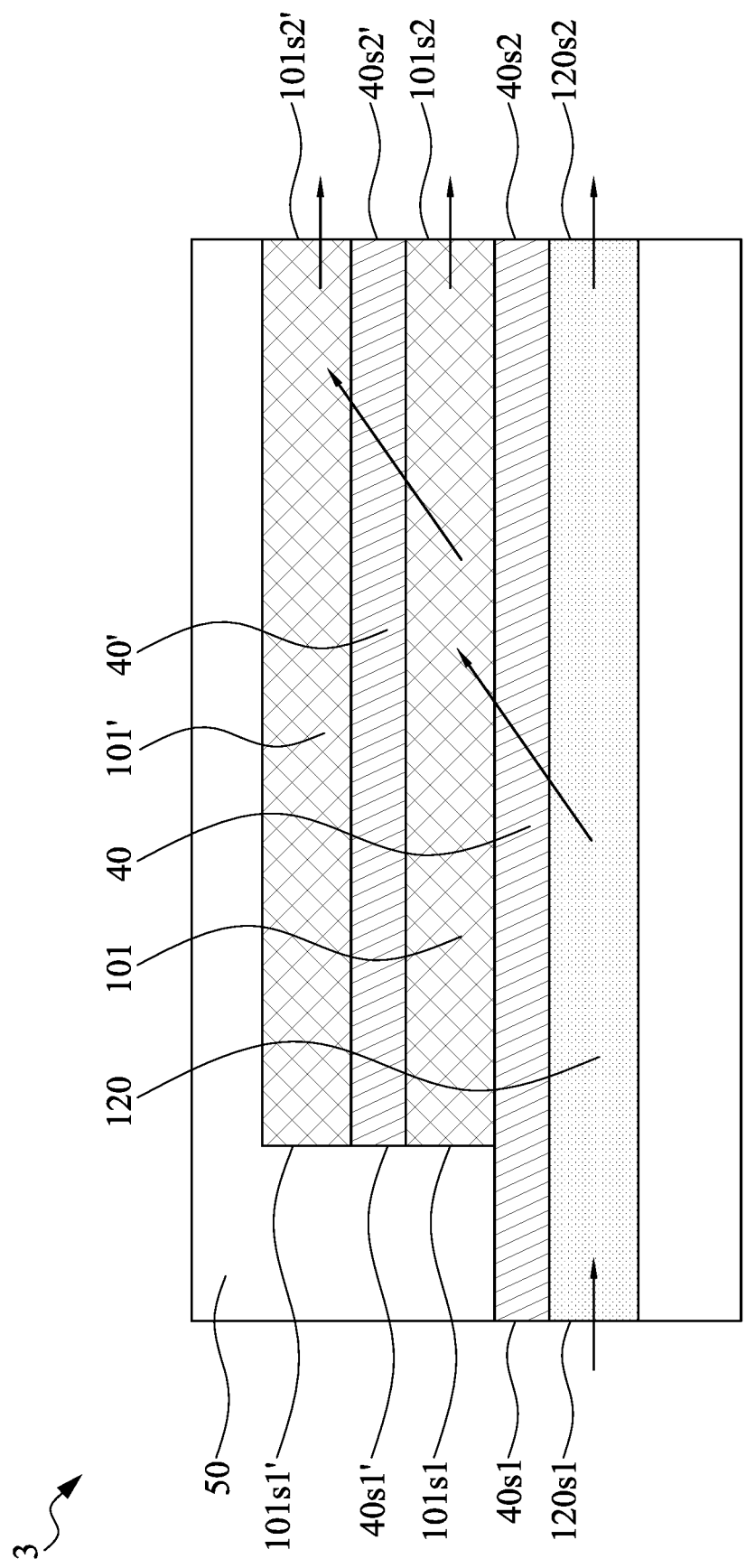
FIG. 5 is a cross-section of an optical device in accordance with some embodiments of the present disclosure.

FIG. 5 is a cross-section of another embodiment of an optical device 3 of the present disclosure. The optical device 3 is similar to the optical device 1 except for the additional third optical layer 101' and high k layer 40'. The portion 120a, portion 120b, portion 101a, and portion 101b are not shown in FIG. 5. The first optical layer 120 includes a top surface 120u, a first sidewall 120s1, and a second side-wall 120s2. In some embodiments, the high k layer 40 is disposed on the first optical layer 120. The second optical layer 101 is disposed on the high k layer 40. The second optical layer 101 includes a top surface 101u, a third sidewall 101s1 and a fourth sidewall 101s2.

A high k layer 40' is disposed on the second optical layer 101. A third optical layer 101' is disposed on the high k layer 40'. The third optical layer 101' includes a TE power splitter. In some embodiments, the materials of the high k layer 40 and 40' are the same. In some embodiments, the materials of the high k layer 40 and 40' are different. In some embodiments, the materials of the third optical layer 101' and the second optical layer 101 can be identical. In some embodiments, the materials of the third optical layer 101' and the second optical layer 101 can be different. In some embodiments, the high k layer 40' may include, but is not limited to, silicon nitride, silicon carbide, silicon carbonitride, silicon oxycarbonitride, aluminum oxide, aluminum nitride, aluminumoxynitride, zirconium oxide, zirconium nitride, zirconium aluminum oxide, hafnium oxide, or a combination thereof. In some embodiments, the third optical layer 101' can include a profile identical to that of the second optical layer 101 from a top view. In some embodiments, the third optical layer 101' can include a profile different than that of the second optical layer 101 from a top view.

In some embodiments, the first sidewall 120s1 of the first optical layer 120 is misaligned with the third sidewall 101s1 of the second optical layer 101. In some embodiments, the second sidewall 120s2 of the first optical layer 120 is coplanar with the fourth sidewall 101s2 of the second optical layer 101. The high k layer 40 includes a fifth sidewall 40s1 and a sixth sidewall 40s2 opposite to the fifth side-wall 40s1. The fifth sidewall 40s1 is coplanar with the first sidewall 120s1. The sixth sidewall 40s2 is coplanar with second sidewall 120s2. In some embodiments, the high k layer 40 fully covers the top surface 120u of the first optical layer 120. In some embodiments, the first optical layer 120 includes a TM power splitter. The second optical layer 101 and the third optical layer 101' includes a TE power splitter. In some embodiments, the high k layer 40' includes a sidewall 40s1' and a sidewall 40s2' opposite to the sidewall 40s1'. In some embodiments, the high k layer 40' fully covers the top surface 101u of the second optical layer 101. In some embodiments, the sidewall 40s1' of the high k layer 40' is coplanar with the sidewall 101s1 of the second optical layer 101. The side-wall 40s2' of the high k layer 40' is coplanar with the sidewall 101s2 of the second optical layer 101. In some embodiments, the sidewall 40s1' of the high k layer 40' is coplanar with the sidewall 101 of the third optical layer 101'. The sidewall 40s2' of the high k layer 40' is coplanar with the sidewall 101s2' of the third optical layer 101'. In some embodiments, a material of the first optical layer 120, the second optical layer 101 and the third optical layer 101' includes silicon nitride (SiN or $Si_3N_4$), In some embodiments, a material of the high k layer 40 and high k layer 40' includes $ZrO_2$ or $HFO_2$ or other suitable materials.

Figure 6:
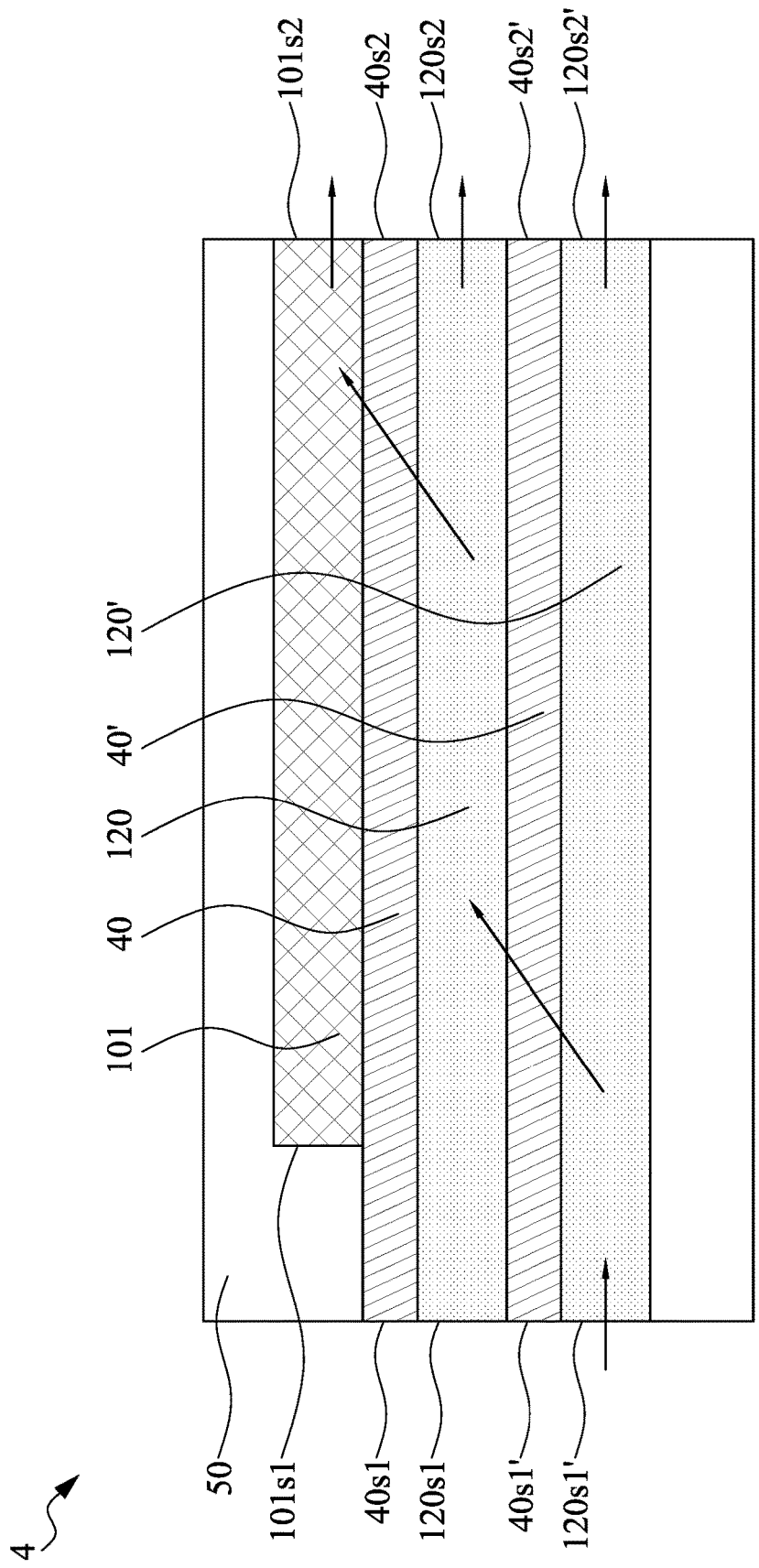
FIG. 6 is a cross-section of an optical device in accordance with some embodiments of the present disclosure.

FIG. 6 is a cross-section of another embodiment of an optical device 4. The optical device 4 is similar to the optical device 1 except for the fourth optical layer 120' and the high k layer 40'. The portion 120a, portion 120b, portion 101a, and portion 101b are not shown in FIG. 6. The first optical layer 120 includes a top surface 120u, a first sidewall 120s1, and a second sidewall 120s2. In some embodiments, the high k layer 40 is disposed on the first optical layer 120. The second optical layer 101 is disposed on the high k layer 40. The second optical layer 101 includes a top surface 101u, a third sidewall 101s1 and a fourth sidewall 101s2.

A high k layer 40' is disposed under the first optical layer 120. A fourth optical layer 120' is disposed below the first optical layer 120. The second optical layer 101 includes a TE power splitter. The first optical layer 120 and the fourth optical layer 120' include a TM power splitter. In some embodiments, the materials of the high k layer 40 and 40' are the same. In some embodiments, the materials of the high k layer 40 and 40' are different. In some embodiments, the materials of the fourth optical layer 120' and the first optical layer 120 can be identical. In some embodiments, the materials of the fourth optical layer 120' and the first optical layer 120 can be can be different. In some embodiments, the fourth optical layer 120' can include a profile identical to that of the first optical layer 120 from a top view. In some embodiments, the fourth optical layer 120' can include a profile different than that of the first optical layer 120 from a top view.

In some embodiments, the first sidewall 120s1 of the first optical layer 120 is misaligned with the third sidewall 101s1 of the second optical layer 101. In some embodiments, the second sidewall 120s2 of the first optical layer 120 is coplanar with the fourth sidewall 101s2 of the second optical layer 101. The high k layer 40 includes a fifth sidewall 40s1 and a sixth sidewall 40s2 opposite to the fifth sidewall 40s1. The fifth sidewall 40s1 is coplanar with the first sidewall 120s1. The sixth sidewall 40s2 is coplanar with second sidewall 120s2. In some embodiments, the high k layer 40 fully covers the top surface 120u of the first optical layer 120. In some embodiments, the high k layer 40' includes a sidewall 40s1' and a sidewall 40s2' opposite to the sidewall 40s1'. In some embodiments, the sidewall 40s1 of the high k layer 40 is coplanar with the sidewall 120s1 of the first optical layer 120. The side-wall 40s2' of the high k layer 40' is coplanar with the sidewall 120s2 of the first optical layer 120. In some embodiments, the side-wall 40s1' of the high k layer 40' is coplanar with the side-wall 120s1' of the fourth optical layer 120'. The sidewall 40s2' of the high k layer 40' is coplanar with the sidewall 120s2' of the fourth optical layer 120'. In some embodiments, a material of the first optical layer 120, the second optical layer 101 and the fourth optical layer 120' includes silicon nitride (SiN or $Si_3N_4$). In some embodiments, a material of the high k layer 40 and high k layer 40' includes $ZrO_2$ or $HFO_2$ or other suitable materials.

Figure 7:
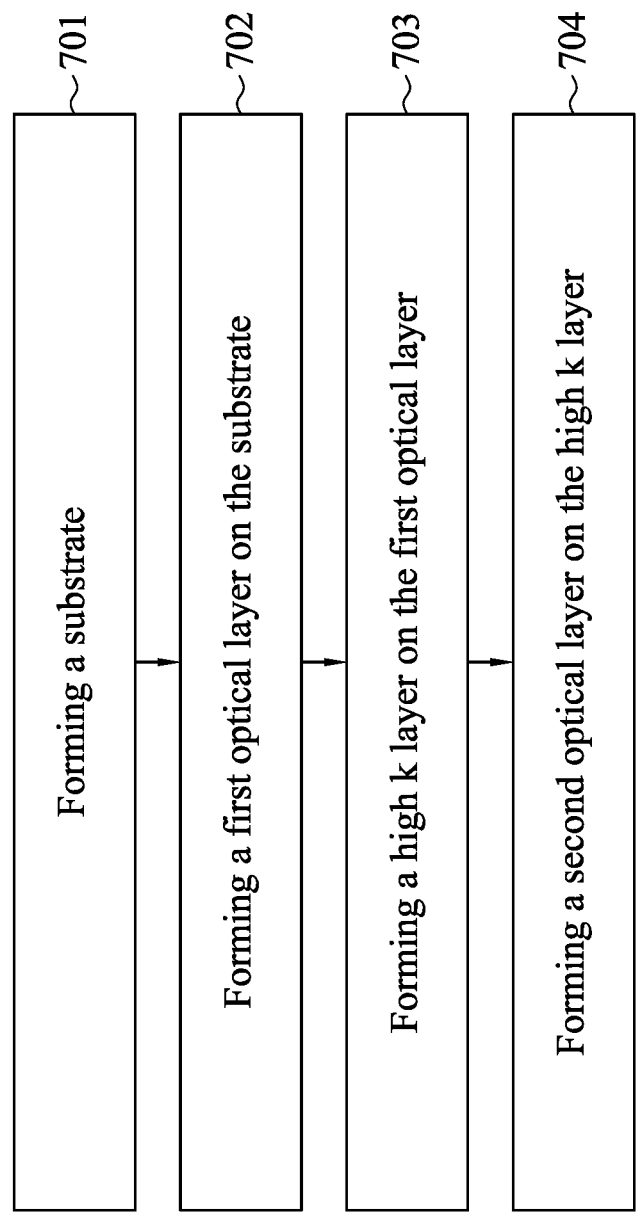
FIG. 7 is a flowchart of an embodiment of a method of manufacturing an optical device in accordance with some embodiments of the present disclosure.

FIG. 7 is a flowchart of an embodiment of a method 700 of manufacturing an optical device 1 in accordance with some embodiments of the present disclosure. The method 700 includes forming a substrate 50 (operation 701). In some embodiments, the substrate 50 may include, for example, silicon oxide ($SiO_2$ or $SiO_x$) or one or more other suitable materials. The method 700 includes forming a first optical layer 120 on the substrate 50 (operation 702). In some embodiments, a material of the first optical layer 120 includes silicon nitride (SiN or $Si_3N_4$). The method 700 includes forming a high k layer 40 on the first optical layer 120 (operation 703). In some embodiments, a material of the high k layer 40 includes $ZrO_2$ or $HFO_2$ or other suitable materials. The method 700 includes forming a second optical layer 101 on the high k layer 40 (operation 704). In some embodiments, a material of the second optical layer 101 includes silicon nitride (SiN or $Si_3N_4$). The present disclosure which can cancel the influence of the polarization uses polarization diversity. The present disclosure splits the TE mode and TM mode by using the vertical polarization power splitters. In order to improve the extinction ratio and the conversion/splitting efficiency, the present disclosure uses two vertical polarization power splitters with a high k layer disposed therebetween.

According to some embodiments, an optical device is provided. The optical device includes a substrate, a first optical layer; a high k layer, and a second optical layer. The first optical layer is disposed on the substrate. The first optical layer comprises a top surface, a first sidewall, and a second sidewall opposite thereto. The high k layer is disposed on the top surface of the first optical layer. The second optical layer is disposed on the high k layer. The second optical layer includes a top surface, a third sidewall, and a fourth sidewall opposite thereto. The first sidewall of the first optical layer is misaligned with the third sidewall of the second optical layer. The second sidewall of the first optical layer is coplanar with the fourth sidewall of the second optical layer.

According to other embodiments, an optical device is provided. The optical device includes a substrate, a first optical layer, a high k layer, and a second optical layer. The first optical layer is disposed on the substrate. The first optical layer includes a top surface, a first sidewall, and a second sidewall opposite thereto. The high k layer is disposed on the top surface of the first optical layer. The second optical layer is disposed on the high k layer. The second optical layer includes a top surface, a third sidewall, and a fourth sidewall opposite thereto. The first optical layer includes a Transverse Magnetic (TM) transmission mode and the second optical layer includes a Transverse Electric (TE) transmission mode. When the first optical layer and the second optical layer project on the substrate, a projection area of the second optical layer falls within a projection area of the first optical layer from a top view.

According to other embodiments, a method for manufacturing an optical device includes forming a substrate; forming a first optical layer on the substrate; forming a high k layer on the first optical layer; and forming a second optical layer on the high k layer, wherein a projection area of the second optical layer falls within a projection area of the first optical layer from a top view.

The methods and features of the present disclosure have been sufficiently described in the examples and descriptions provided. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. An optical device comprising:
   a substrate;
   a first optical layer on the substrate, wherein the first optical layer comprises a top surface, a first sidewall and a second sidewall opposite to the first sidewall;
   a high k layer disposed on the top surface of the first optical layer, wherein the high k layer comprises a fifth sidewall and a sixth sidewall opposite to the fifth sidewall, wherein the fifth sidewall is coplanar with the first sidewall and the sixth sidewall is coplanar with second sidewall; and
   a second optical layer on the high k layer, wherein the second optical layer comprises a top surface, a third sidewall and a fourth sidewall opposite to the third sidewall, wherein the first sidewall of the first optical layer is misaligned with the third sidewall of the second optical layer, and wherein the second sidewall of the first optical layer is coplanar with the fourth sidewall of the second optical layer.

2. The optical device of claim 1, wherein a material of the substrate includes $SiO_2$, and wherein the high k layer fully covers the top surface of the first optical layer.

3. The optical device of claim 1, wherein the first optical layer includes a Transverse Magnetic (TM) power splitter and the second optical layer includes a Transverse Electric (TE) power splitter.

4. The optical device of claim 1, wherein a material of the first optical layer and the second optical layer includes SiN, wherein the refractive index of the high k layer is greater than the refractive index of the first optical layer and the second optical layer.

5. The optical device of claim 1, wherein a lateral width of the second optical layer is less than a lateral width of the first optical layer.

6. The optical device of claim 1, wherein the second optical layer tapers from the fourth sidewall toward from the third sidewall from a top view, and wherein the first optical layer tapers from the second sidewall toward the first sidewall from a top view.

7. The optical device of claim 6, wherein when the first optical layer and the second optical layer project on the substrate, a projection area of the second optical layer falls within a projection area of the first optical layer from a top view.

8. The optical device of claim 1, wherein the first optical layer further comprises a first leg portion for receiving the light and two second leg portions for outputting the light, and wherein the second optical layer further comprises a third leg portion for receiving the light and two fourth leg portions for outputting the light.

9. The optical device of claim 1, further comprising a third optical layer disposed on the second optical layer, wherein the third optical layer includes a TE power splitter.

10. The optical device of claim 1, further comprising a fourth optical layer disposed below the first optical layer, wherein the fourth optical layer includes a TM power splitter.

11. The optical device of claim 1, wherein a projection area of the first optical layer is larger than a projection area of the second optical layer from a top view.

12. The optical device of claim 1, wherein the first optical layer includes an asymmetric profile from a top view, and wherein the first optical layer and the second optical layer include different profiles from a top view.

13. An optical device comprising:
    a substrate;
    a first optical layer on the substrate, wherein the first optical layer comprises a top surface, a first sidewall and a second sidewall opposite to the first sidewall;
    a high k layer disposed on the top surface of the first optical layer; and
    a second optical layer on the high k layer, wherein the second optical layer comprises a top surface, a third sidewall and a fourth sidewall opposite to the third sidewall, wherein the first optical layer includes a Transverse Magnetic (TM) transmission mode and the second optical layer includes a Transverse Electric (TE) transmission mode, and wherein when the first optical layer and the second optical layer project on the substrate, a projection area of the second optical layer falls within a projection area of the first optical layer from a top view.

14. The optical device of claim 13, wherein the high k layer comprises a fifth sidewall and a sixth sidewall opposite to the fifth sidewall, wherein the fifth sidewall is coplanar with the first sidewall and the sixth sidewall is coplanar with second sidewall.

15. The optical device of claim 13, wherein a material of the substrate includes $SiO_2$ and wherein a material of the first optical layer and the second optical layer includes SiN, and wherein a lateral width of the second optical layer is less than a lateral width of the first optical layer.

16. The optical device of claim 13, wherein the second optical layer tapers from the fourth sidewall toward the third sidewall from a top view, and wherein the first optical layer tapers from the second sidewall toward the first sidewall from a top view.

17. The optical device of claim 13, wherein the first optical layer further comprises a first leg portion for receiving the light and two second leg portions for outputting the light and wherein the second optical layer further comprises a third leg portion for receiving the light and two fourth leg portions for outputting the light.

18. The optical device of claim 13, further comprising a third optical layer disposed on the second optical layer, wherein the third optical layer includes a TE power splitter.

19. The optical device of claim 13, further comprising a fourth optical layer disposed below the first optical layer, wherein the fourth optical layer includes a TM power splitter.

20. A method for manufacturing an optical device comprising:
    forming a substrate;
    forming a first optical layer on the substrate;
    forming a high k layer on the first optical layer; and
    forming a second optical layer on the high k layer, wherein a projection area of the second optical layer falls within a projection area of the first optical layer from a top view, wherein a material of the substrate includes $SiO_2$ and a material of the first optical layer and the second optical layer includes SiN.

* * * * *